Nov. 6, 1951     F. W. SEE     2,574,066
SHEARS FOR PRODUCING ZIGZAG CUTS
Filed Oct. 20, 1950
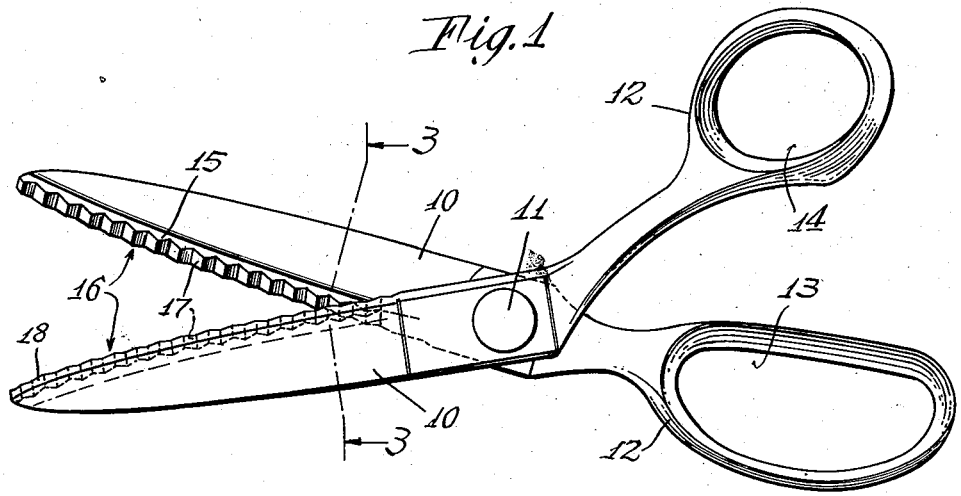
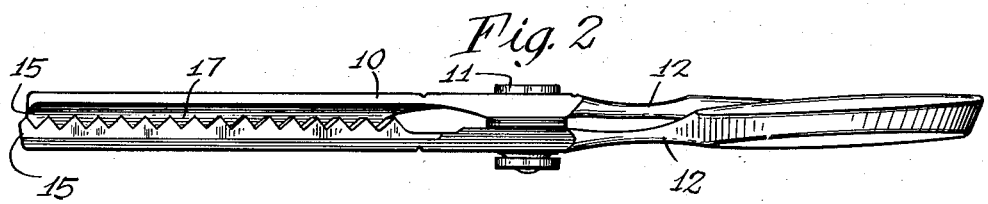
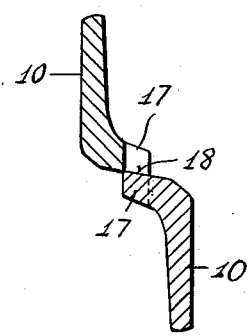
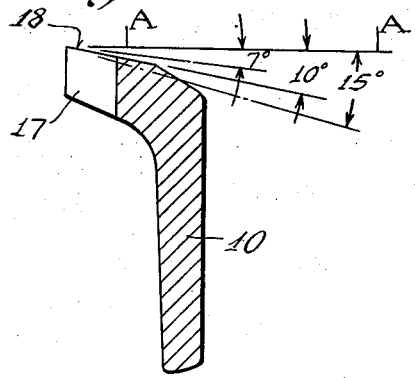
Inventor
Francis W. See
By Johnson and Kline
Attorneys Patented Nov. 6, 1951

2,574,066

UNITED STATES PATENT OFFICE 2,574,066

SHEARS FOR PRODUCING ZIGZAG CUTS

Francis W. See, Bronx, N. Y., assignor to
Samuel Briskman, New York, N. Y.

Application October 20, 1950, Serial No. 191,203

3 Claims. (Cl. 30—230)

The present invention relates to shears for forming zigzag cuts in fabric and particularly to forming said cuts without bunching of the fabric and without increasing the force necessary to make such cuts.

This is an improvement on the shears shown in United States Letters Patent No. 2,286,874. In said patent, a shearing surface is provided on the edge of the blades which has a following or negative angle with respect to the plane of cutting. While such shears are satisfactory for cutting one or two thicknesses of material they are difficult to use when the number of plies of material or the thickness of the material is increased due to the fact that the negative angle tends to cause the material to bind in the shears and require undue force for operating the same.

According to the present invention the prior difficulties have been overcome by providing the blades with a shearing surface having a predetermined critical leading or positive angle with respect to the plane of cutting. I have discovered that by providing blades with a shearing surface which forms a leading angle of 10° with respect to the plane of cutting and combining the same with a longitudinally curved edge on the blade so arranged that the teeth formed in the ridge on the blades are in single-tooth cutting engagement throughout the operation of the shears, I am able to sever several times the thicknesses of material heretofore permissible without having to apply any greater force than was required with shears of the type disclosed in said patent.

The leading angle of the shearing surface is a critical factor for if it varies substantially from the preferred 10° the blade will not cut properly or will not retain its cutting edge. The maximum limits in which a practical blade may be produced is one having a leading angle of not less than 7° and not more than 15°.

Blades having a shearing surface with the leading angle as required present a sufficient face-to-face relationship of the shearing surfaces to control the movement of the material and tend to move the material laterally away from the cutting edge so that there is no tendency to bunch or bind. This action of the present blade also maintains the cloth in tension across the cutting edge as it is cut so that a clean cut is produced.

By the use of the present invention in combining the leading shearing surface with the curved edge so that cuts through thicker material can be made without increasing the required force, I have been able to employ blades of lighter weight metal which are capable of producing satisfactory cuts through several plies of material, thus reducing the weight and cost of the shears.

Other features and advantages of the invention will be apparent from the specification and claims when considered in connection with the drawings in which:

Figure 1 is a plan view of the shears in open position.

Fig. 2 is a side elevation of the shears in closed position.

Fig. 3 is a sectional view through the blades taken along line 3—3 of Fig. 1.

Fig. 4 is an enlarged sectional view of one blade illustrating the critical angles.

As shown in the drawings the shears of the present invention comprises a pair of blades 10 pivotally connected at 11 and provided with operating handles 12 having the usual finger and thumb openings 13, 14. Each of the blades 10 has formed on its facing sides ridges 15 extending along the cutting edges 16 thereof. Each of the ridges has milled therein complementary zigzag teeth 17 which cooperate to produce a zigzag cut when the shears are operated.

According to the present invention the cutting edge of each of the blades is provided with a shearing surface 18 extending along the teeth which, as shown in Fig. 4, slopes back from the cutting edge of the teeth and produces a leading angle which is inclined toward the plane of cutting as indicated by line A—A. I have found that the value of this angle is critical in order to produce a satisfactory shears in which the blades have a tendency during the cutting operation to move the cloth laterally away from the point of cutting and prevent bunching of the cloth between the blades. In the preferred form of the invention I employ a leading 10° angle; however, it may vary between 7° and 15° and still produce a satisfactory cutting edge. If the angle is less than 7° it will not be sufficiently effective to prevent the bunching or binding action and if the angle is greater than 15° the blade will not retain, but will readily lose its cutting ability and not produce a satisfactory cut.

As shown in Fig. 1, the cutting edges are longitudinally curved starting from a point forward of the pivot intersecting at the ends of the blades at a point in line with the pivot, the curve being such that there is substantially single-tooth engagement throughout the cutting operation. This single-tooth engagement combined with the leading angle which prevents bunching enables me to cut a greater thickness of material than heretofore could be cut without having to exert any more force on the handles than was previously required. Also, this combined action of the single-tooth engagement with the leading angle on the cutting edge enables me to produce shears having satisfactory cutting characteristics of a much lighter weight material since it greatly reduces the force necessary to cut through the fabric when the usual two or three layers of fabric are employed.

Variations and modifications may be made within the scope of the claims and portions of the improvements may be used without others.

I claim:

1. A shear for making a zigzag cut having a pair of pivoted blades provided with facing ridges on opposite edges thereof having transversely extending cooperating teeth, said edges of the blades being longitudinally curved from a point forward of the pivot and intersecting at the ends of the blades at a point in line with the pivot and being provided with a shearing surface extending along the teeth, said surface sloping back from the cutting edge and forming a leading angle of 10° with the plane of cutting.

2. In shears for making a zigzag cut having blades provided with facing ridges on opposite longitudinally curved edges thereof having transversely extending cooperating teeth, the improvement of providing the curved edges with a shearing surface extending along the teeth, said surface sloping back from the cutting edge and forming a leading angle of 10° with the plane of cutting.

3. In shears for making a zigzag cut having blades provided with facing ridges on opposite longitudinally curved edges thereof having transversely extending cooperating teeth, the improvement of providing the curved edges with a shearing surface extending along the teeth, said surface sloping back from the cutting edge and forming a leading angle of between 7° and 15° with the plane of cutting.

FRANCIS W. SEE.

REFERENCES CITED

The following references are of record in the file of this patent:

UNITED STATES PATENTS

| Number | Name | Date |
|---|---|---|
| 1,903,257 | Dahl | Mar. 28, 1933 |
| 2,395,896 | Mitchell | Mar. 5, 1946 |
| 2,395,897 | Kethcart | Mar. 5, 1946 |

FOREIGN PATENTS

| Number | Country | Date |
|---|---|---|
| 382,166 | Great Britain | of Oct. 20, 1932 |